April 12, 1966  H. SIKORA  3,245,735

SEAL FOR ANTIFRICTION BEARINGS

Filed Oct. 15, 1963  3 Sheets-Sheet 1

April 12, 1966    H. SIKORA    3,245,735
SEAL FOR ANTIFRICTION BEARINGS
Filed Oct. 15, 1963    3 Sheets-Sheet 2

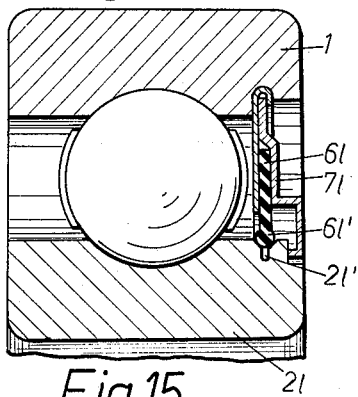
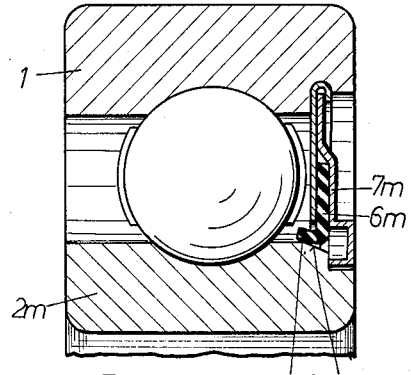
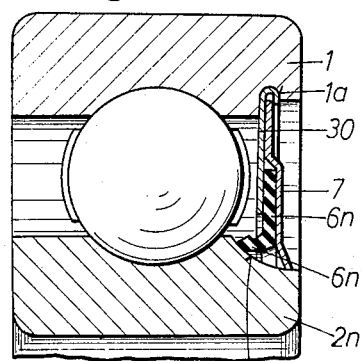
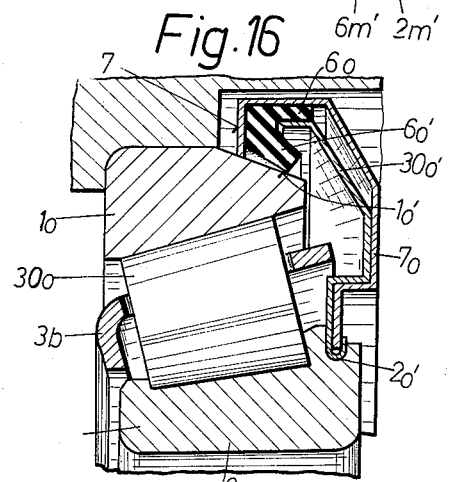
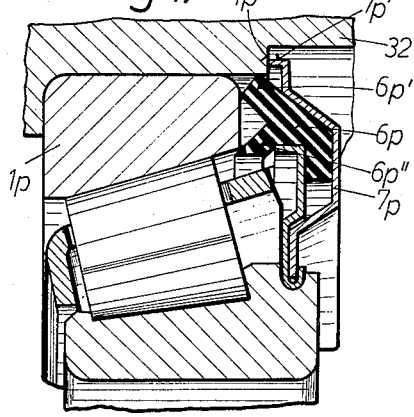
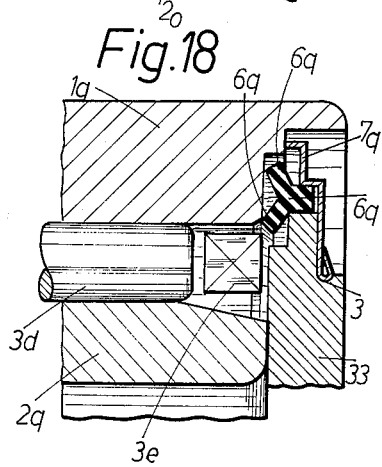

United States Patent Office 3,245,735
Patented Apr. 12, 1966

3,245,735
SEAL FOR ANTIFRICTION BEARINGS
Hans Sikora, Dusseldorf, Germany, assignor to Hans Ziller, Millroth uber Hochdahl, Germany
Filed Oct. 15, 1963, Ser. No. 316,383
Claims priority, application Germany, Oct. 16, 1962, Z 9,718; Aug. 14, 1963, Z 10,291
3 Claims. (Cl. 308—187.1)

The present invention relates to a seal for antifriction bearings and, more specifically, relates to a seal which includes one or more sealing discs and a ring of rubber or the like frictionally engaging the antofriction bearing to be sealed. Seals of this type are additionally mounted on an antifriction bearing or are installed within an antifriction bearing in order to seal the bearing against the escape of oil and the entry of dust or other impurities. A number of sealing assemblies of the above-mentioned type comprises a plurality of elements which are arranged in a rather complicated manner and which have to be mounted loosely in or on a bearing. The sealing body proper consists of a rectangular ring having a relatively large engaging surface. This ring is supported by a resilient metal member and as so-called sliding ring is pressed against a portion of the bearing.

It is also known by means of a resilient element to press the elastic sealing body against the surface to be sealed in order, in this way, to obtain a particularly good sealing effect. Arrangements of this type, however, have the drawback that the various types of sealing bodies are not at all or only insufficiently protected against soiling from the outside so that they are destroyed by the influence of soil, impurities and the like after a relatively short period of operation. Moreover, with the sealing arrangements above referred to, frequently too high a friction is encountered with the result of increased heat development and wear.

It is, therefore, an object of the present invention to provide a sealing arrangement of the above-mentioned general type, which will overcome the above-mentioned drawbacks.

It is another object of this invention to provide a seal for antifriction bearings which includes an elastic oil-resilient sealing ring of rubber or the like in which said ring is properly protected against the influence of outside impurities while the bearing will be properly secured against oil loss and the entry of soiling matter.

It is a further object of this invention to improve sealing arrangements for antifriction bearings as set forth above, which will yield a threefold sealing of the bearing without the necessity of employing complicated seals.

These and other objects and advantages of the invention will appear more clearly from the following specification in connection with the accompanying drawings, in which:

FIG. 13 is a section through a portion of an antifriction bearing in which an elastic sealing ring is provided having a bead-shaped sealing lip extending into a groove of the inner race ring FIG. 14 shows a design characterized primarily in that the inner ring is provided with a beveled surface.

FIG. 15 represents an arrangement similar to that of FIG. 14 having a rounded surface engaged by the lip of the sealing ring.

FIG. 16 shows the present invention as applied to a tapered roller bearing.

FIG. 17 illustrates an arrangement similar to that of FIG. 16, but differs therefrom in that the sealing ring is provided with two lips resting against a surface of the outer race ring.

FIG. 18 illustrates the application of the present invention to a needle bearing.

Figure 1:
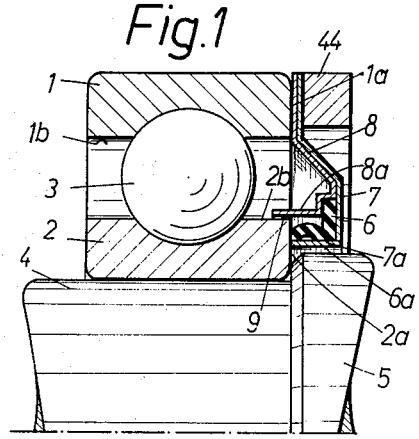
FIG. 1 is a section through an antifriction bearing provided with a sealing arrangement according to the invention employing a sealing ring of substantially L-shaped cross section.

The sealing arrangement according to the present invention is characterized primarily in that elastic oil-resistant sealing ring employed in connection with a bearing of the type involved is covered toward the outside by a protective disc having one edge thereof in frictional engagement with a race ring of the bearing.

In addition to the sealing ring and the outer protective disc, there may also be provided a deviating disc directing any oil, which may have the tendency to escape, toward the interior of the bearing. Advantageously, between said deviating disc and one of the race rings of the bearing or another part of the seal there may be provided a sealing gap. In this way a threefold sealing of the antifriction bearing will be obtained without the employment of complicated seals. The sealing ring which consists of oil-resistant elastic material may preferably be of an angular, L-shaped or V-shaped cross section. This sealing ring will alone due to its shape sealingly engage the respective adjacent race ring and also one of the discs. This brings about that the sealing ring will at a certain preload press against the anti-friction race ring or rings and will also press against another surface. This is due to the elasticity of the material of which the sealing ring is made.

According to a practical embodiment of the present invention, a sealing ring of substantially angular cross section may be clamped between the two discs or may be glued to one of them. In conformity with a particularly simple embodiment of the invention, an O-ring is used as sealing ring. In addition thereto, at the clamping portion between the discs, there may be provided a rubber disc resting against the bearing bore in order in this way to prevent a loss of oil.

The seal may in customary manner be arranged directly adjacent one of the anti-friction bearing race rings. In this connection the seal is clamped fast during the installation of the anti-friction bearing. However, if desired, the sealing elements may be arranged in conformity with the antifriction bearing in order, in this way, to take into consideration the length of design of the sealing arrangement according to the invention. In this connection the sealing ring may likewise be clamped between the two discs or glued to one of them.

According to a modification, the protective disc and the deviating disc may be so designed that they extend around the end faces of the bearing rings. Such an arrangement is of particular advantage when the discs are made of corrosion-resistant material. This is particularly advantageous with installations in the food industry or the like.

In order to obtain a sealing arrangement for an anti-friction bearing which sealing arrangment may be installed in a rather narrow chamber, it is furthermore suggested, according to the present invention, to provide a clamping disc in parallel arrangement to the protective disc and to clamp between or glue an elastic sealing ring into one of said two protective discs. With this design it is advantageous to employ sealing lips which alone, due to their shape, sealingly engage one of the race rings of the bearing. When such lips engage the respective race ring under pre-load, i.e., are biased toward the respective adjacent race ring, a highly satisfactory lip sealing will be obtained. This is true above all when the sealing lips which preferably have an angular or L-shaped or V-shaped cross section are provided with sealing ribs directed against the oil flow and engage a race ring at a certain angle. The protective disc is advantageously together with the elastic sealing ring and the clamping disc installed within the bearing chamber between the inner and outer race ring so that a complete bearing unit will be created.

According to a practical embodiment, the protective disc and the clamping disc may be connected to each other by flanging one of the discs. The thus interconnected discs are then pressed into a groove provided in a race ring. The sealing lips of the elastic sealing ring engage a beveled or rounded surface or a groove in the race ring of the bearing. When employing a groove, the sealing lip rests also with its back against a portion of a race ring of the bearing.

For sealing a bevel roller bearing, the protective disc may by means of its angled off end face and the elastic sealing ring rest against a rounded surface of the outer race ring of the bearing. With bevel roller bearings, also the elastic sealing ring may have one or more of its lips engage the end face of one of the race rings of the bearing. On the other hand, the protective disc may rest against a step or the like in the housing of the bearing.

Finally, the invention may also advantageously be employed in connection with needle bearings which, as is well known, have only a minor radial extension. In this connection, the elastic sealing ring between the disc acting as clamping disc and similar to the protective disc may be brought to rest against the outer race ring.

Referring now to the drawings in detail, with the various illustrated embodiments, the ball bearing comprises in customary manner an outer race ring 1, an inner race ring 2 and the balls 3. The ball bearing may, for instance, be mounted on a stud 4 of a shaft 5.

The seal according to the present invention as illustrated in FIG. 1 has a sealing ring 6 of rubber or the like which in conformity with FIG. 1 has a somewhat L-shaped cross section. Leg 6a of said L-shaped cross section rests against the end face 2a of the inner race ring 2. This sealing ring 6 is held in its position by an outer protective disc 7 which in a manner known per se has the edge of its marginal portion 7a in engagement with the end face 2a of inner race ring 2. In addition thereto, there is provided an inner deviating disc 8 with an angled-off leg 8a which extends into the interior of the bearing. As will be evident from the drawing, a sealing gap 9 is provided between the outer circumferential surface 2b and that portion of the leg 8a which extends into the annular space confined by the outer circumferential surface 2b of inner race ring 2 and the inner circumferential surface 1b of the outer race ring 1.

The two discs 7 and 8 have their outer marginal portions clamped against the end surface 1a of the outer race ring.

In order to prevent the sealing ring 6 from rotating and from detaching itself from the bearing, ring 6 may be clamped fast between the two discs 7 and 8. This may be done in any convenient manner, for instance by shaping the inner and outer discs accordingly as shown, for instance, in FIG. 1. The elasticity of the sealing ring 6 will be obtained by an extensive pre-load which may be brought about by subjecting the seal to such a pressure that its leg portion 6a curves somewhat as shown in FIG. 1 and in this curved or arched condition engages the surface to be sealed, in this instance the end face 2a of inner race ring 2.

Figure 2:
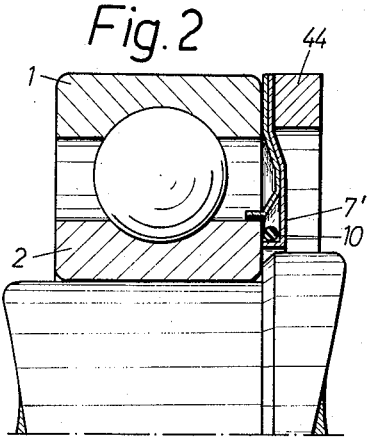
FIG. 2 is a section similar to that of FIG. 1, in which instead of the sealing ring employed therein an O-ring is used.

FIG. 2 shows a seal somewhat similar to that of FIG. 1 but differing therefrom in that an O-ring 10 is employed. This O-ring 10 is likewise held by the outer protective disc 7'. Also in this instance, by correspondingly dimensioning O-ring 10, an elastic engagement of O-ring 10 with the inner race ring 2 will be assured.

Figure 3:
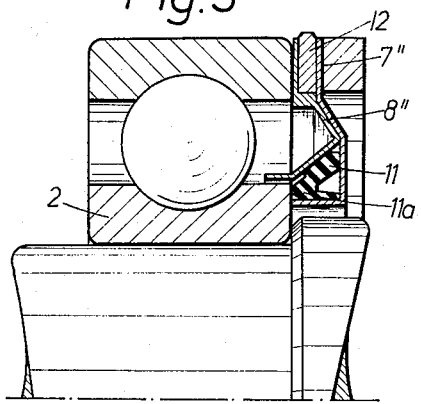
FIG. 3 represents a section similar to that of FIGS. 1 and 2 but differing therefrom in that the sealing ring has a V-shaped cross section.

The sealing arrangement according to FIG. 3 employs a sealing ring 11 of a somewhat V-shaped cross section. Ring 11 has a lip 11a sealingly engaging the adjacent end face of inner race ring 2. Also, in this instance, an inner disc 7" and an outer disc 8" are provided. As will be evident from FIG. 3, between the outer marginal portions of said discs 7" and 8", a further ring, 12, of elastic material, such as rubber, is provided whose outer circumference is greater by a few tenths of a millimeter than the bore of the bearing in order to prevent the escape of creeping oil.

Figure 4:
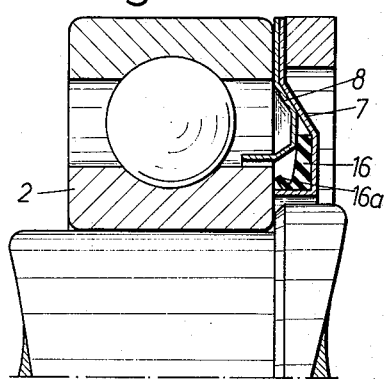
FIG. 4 shows a further modification of the sealing arrangement of the invention in which the sealing ring has an inverted L-shaped cross section.

According to the embodiment of FIG. 4, the sealing ring 16 of a somewhat L-shaped cross section has a lip 16a sealingly engaging the adjacent end face of inner race ring 2 of the anti-friction bearing shown therein. Also, in this instance, the sealing ring 16 is clamped in between an outer protective disc 7c and an inner disc 8c in order to prevent the sealing ring from rotating or from detaching itself from the bearing. However, if desired, sealing ring 16 may instead be clamped into the protective disc 7c.

Figure 5:
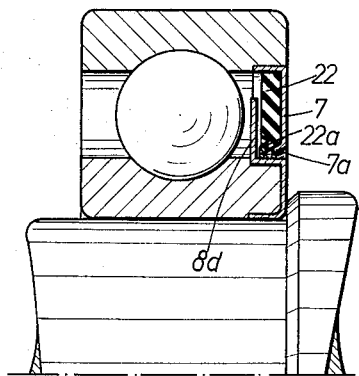
FIG. 5 shows a cross section through a seal according to the invention which employs a sealing ring somewhat similar to that of FIG. 4 but with a lip engaging a part of the bearing in radial direction.

While, with the above described embodiments of FIGS. 1 to 4, the sealing ring always engages the bearing in axial direction, FIG. 5 shows an embodiment in which a sealing ring 22 is provided with a lip 22a engaging the bearing in radial directions. This lip forms a single part but, if desired, may consist of two or more parts. Sealing ring 22 is connected to the outer disc 7d which has its inner marginal portion 7a' slightly bent inwardly and in frictional engagement with the inner disc 8d. Also, with this embodiment, it is assured that no foreign bodies can enter the bearing from the outside. The inner deviating disc 8d has its outer marginal portion substantially parallel to the sealing ring 22 and forms therewith a sealing gap for the lubricant.

Figure 6:
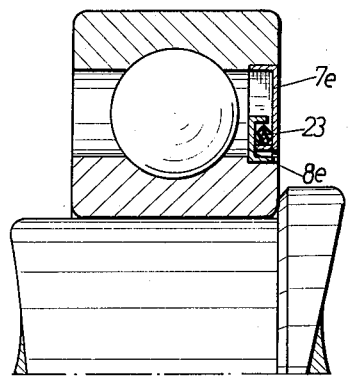
FIG. 6 represents a sealing arrangement according to the invention employing an elastic hose-like sealing ring.

FIG. 6 shows an arrangement with an elastic hose-like sealing ring 23 arranged between the outer protective disc 7e of a substantially U-shaped cross section and the inner disc 8e which likewise has a substantially U-shaped cross section.

Figure 7:
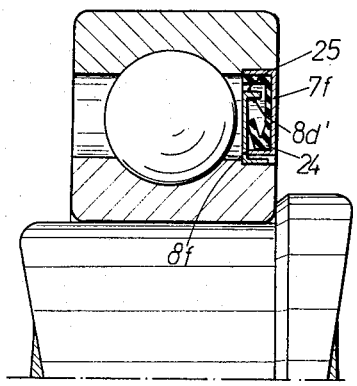
FIG. 7 represents an arrangement similar to that of FIG. 6 but with a somewhat C-shaped sealing ring.

The embodiment shown in FIG. 7 is somewhat similar to that of FIG. 6 but in contrast to the latter employs a sealing ring 24 of substantially C-shaped cross section. The inner disc 8f has its outer marginal portion 8d' bent inwardly to form a sealing gap 25 with the adjacent portion of sealing ring 24.

As will be evident from the drawing, also with this embodiment, the inner marginal portion of ring 7e has its edge in engagement with the inner disc 8f.

Figure 8:
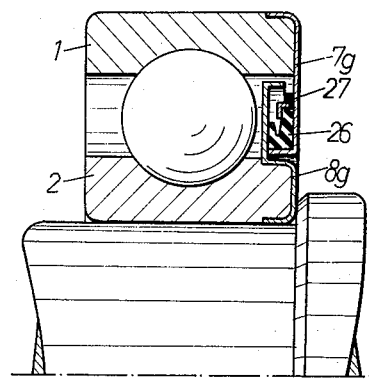
FIG. 8 is a sealing arrangement somewhat similar to that of FIG. 7 with a V-shaped sealing ring.

According to the embodiment of FIG. 8, discs 7g and 8g extend along and around the end faces of the race rings 1 and 2. A sealing ring 26 of V-shaped cross section is held in its position by an additional ring 27.

Figure 9:
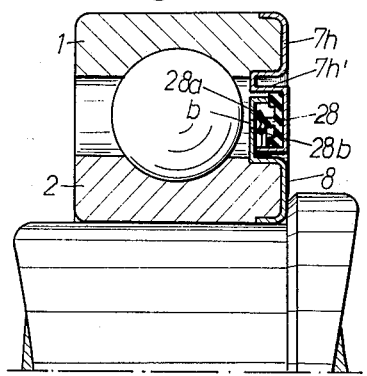
FIG. 9 represents a still further modification of the invention according to which the sealing ring is equipped with two lips.

According to the embodiment of FIG. 9, the outer disc 7h slightly differs from the outer disc 7g of FIG. 8 by an inwardly bent portion 7h'. Furthermore, the sealing ring 28 has two lips 28a and 28b engaging adjacent portions of the inner ring 8. Moreover, the inner disc 8h is provided with a bore b.

Figure 10:
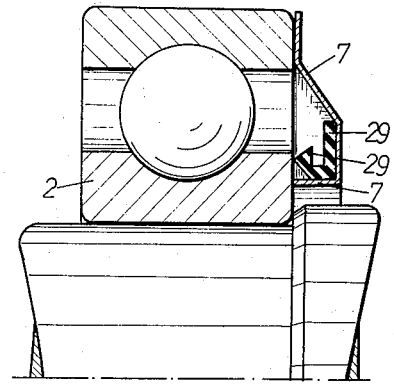
FIG. 10 shows a sealing arrangement which differs from that of FIGS. 1 to 9 primarily in that while the arrangement of FIGS. 1 to 9 employs two discs, the inner disc has been omitted in the embodiment of FIG. 10.

As will be evident from the above, with the embodiments according to FIGS. 1 to 9, in addition to the sealing ring and the outer protective disc there is provided an inner deviating disc. However, it is also possible to do without said inner disc, particularly if the pressure of the lubricant is not too high. Thus, according to FIG. 10, the sealing ring 29 is connected to the outer protective disc 7i. A lip 29a of the sealing ring 29 and the inner marginal portion 7i' of the protective disc engage the end face of the inner race ring 2.

Also with the embodiments according to FIGS. 11 to 18, the anti-friction bearing customarily comprises an outer race ring 1 and an inner race ring 2 having therebetween provided the anti-friction bodies, for instance balls 3 and the ball cage 3a. For purposes of sealing these bearings, there is likewise provided a protective disc 7j . . . 7q which in a manner known per se has its inner marginal portion bent toward the adjacent end face of the respective inner race ring so as to engage the same by the edge of said bent portion.

Figure 11:
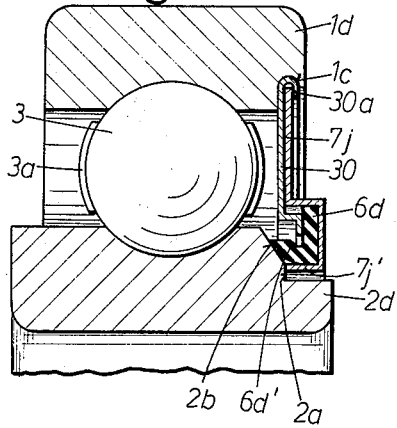
FIG. 11 illustrates a sealing arrangement according to the invention for an antifriction bearing in which the inner race ring has a greater width than the outer race ring.

More specifically with regard to FIG. 11, the inner race ring 2d has a step 2a which is engaged by the bent or angled-off inner marginal portion 7j' of the disc 7j. The arrangement also comprises an oil-resistant sealing ring 6d which is held in disc 7j by a clamping disc 30. In order to hold these parts together, the clamping disc 30 may, for instance, be provided with a flanged portion 30a folded about the outer marginal portion of the protective disc 7j. This sealing arrangement is held in a groove 1c in the outer race ring 1d. The sealing arrangement is clamped into said groove 1c under pre-load. Sealing ring 6d has a sealing lip 6d' in engagement with a beveled portion 2b' of the inner race ring 2d.

Figure 12:
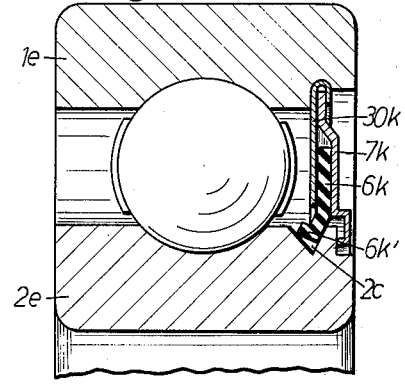
FIG. 12 shows a sealing arrangement somewhat similar to that of FIG. 11 but for an antifriction bearing in which the inner and outer race rings have substantially the same width.

Referring now to the embodiment of FIG. 12, this arrangement differs from that of FIG. 11 primarily in that the inner race ring 2e has the same width as the outer race ring 1e. The seal itself is likewise composed of a protective disc 7k, a sealing ring 6k and a clamping disc 30k. Sealing ring 6k has a lip 6k' of a substantially V-shaped cross section which extends in a corresponding groove 2c of the inner race ring 2e.

According to the embodiment of FIG. 13, the sealing lip 61' of the elastic sealing ring 61 is bead-shaped and extends into a groove 21' of the inner race ring 21. All other parts are similar to those of the embodiment of FIG. 12.

FIG. 14 shows a sealing arrangement according to the present invention in which the inner race ring 2m has a bevel portion 2m' which is engaged by the lip 6m' of the sealing disc 6m. Lip 6m' is slightly curved.

The arrangement of FIG. 15 is somewhat similar to that of FIG. 14 inasmuch as also in FIG. 15 the sealing disc 6n has a slightly curved lip 6n' which engages a curved surface 2n' of the inner race ring 2n. Also in this instance a protective disc 7n and a clamping disc 30n is employed.

FIG. 16 shows the application of a sealing arrangement according to the invention to a tapered roller bearing with an outer race ring 1o and an inner race ring 2o, a cage 3b and the tapered rollers 30o. In this instance, a sealing ring 6o is employed which may have a V-shaped cross section and the lip 6o' of which rests against a tapered surface 1o' of the outer race ring 1o. The arrangement shown in FIG. 16 furthermore comprises a protective disc 7o which in cooperation with a clamping disc 30o' holds the sealing ring 6o in its position. The two discs 7o and 30o' are held in a groove 2o' of the inner race ring 2o.

FIG. 17 likewise shows the present invention in connection with a tapered roller bearing. However, in contrast to the arrangement of FIG. 16, according to FIG. 17 the sealing ring 6p is provided with two lips 6p' and 6p" engaging an adjacent surface of the outer race ring 1p. The protective disc 7p has its outer marginal portion 7p' in frictional engagement with a step 31 of the bearing body 32.

Finally, with regard to FIG. 18, this figure illustrates how the basic idea according to the present invention may also be applied to a needle bearing having an outer race ring 1q, an inner race ring 2q, needles 3d and a cage 3e. With this arrangement, the abutment disc 33 of the needle bearing simultaneously serves as clamping disc. Sealing ring 6q, provided with two sealing lips 6q' and 6q", is clamped in between the said disc 33 and the protective disc 7q, protective disc 7q being clamped into a groove 33a of disc 33.

As will be evident from the above, an anti-friction sealing arrangement as described consists of a minimum of parts of simple design and, therefore, is inexpensive while it may be employed with any speeds and at various oil pressures occurring in connection therewith. Depending on the required easy operation of the bearing or the bearing air to be bridged, the outer protective disc may at high or less high pre-load frictionally engage the other ring of the anti-friction bearing. When a particularly high oil pressure prevails, a proper seal will also be assured by having the sealing lip directed against the oil flow more firmly engage a beveled or rounded surface or a groove in one of the race rings.

The lip of the sealing ring which may have an angular, L or V-shaped cross section, will alone by its shape have the tendency to suck itself fast more strongly at high oil pressure and thereby still further to improve the sealing effect.

With all embodiments shown in the drawings, it is possible to provide a sealing filling in the chambers confined by the outer protective disc and the sealing ring whereby, on one hand, an undue wear will be avoided, and on the other hand, also the rather sensitive sealing ring will be lubricated. This is of particular importance when the small quantity of oil which may enter these chambers should not suffice by itself for lubricating the sealing ring.

The outer protective disc and also the inwardly located clamping disc may, preferably, be made of metal, but also synthetic material may be employed for said discs.

It is, of course, to be understood that the present invention is, by no means, limited to the particular constructions shown in the drawings but also comprises any modifications within the scope of the appended claims.

What I claim is:

1. In combination with an anti-friction bearing having an outer race ring and an inner race ring coaxially arranged within said outer race ring in radially spaced relationship thereto so as to confine therewith an annular space: a pair of sealing members having plane marginal portions clamped against one of said race rings, the inner of said members extending radially and inwardly into said bearing space with its other marginal portion closely spaced from the inner surface of said other race ring, the outer of said sealing members extending radially beyond said first member and formed with a laterally extending marginal portion having its edge in contact with the radially extending face of said other race ring so that said two sealing members and said other race ring form a space therebetween, and a resilient rubberlike sealing element in said space and held against said other race ring by said outer sealing member.

2. The combination defined in claim 1, in which said resilient sealing element is held between said sealing members and extends into said space between the two said sealing members and said other race ring.

3. The combination defined in claim 1, in which said resilient sealing element is held in contact with the radial face of said other race ring by said outer sealing member.

References Cited by the Examiner

UNITED STATES PATENTS

| | | | |
|---|---|---|---|
| 2,034,567 | 3/1936 | Fernstrom | 308—187.2 |
| 2,054,582 | 9/1936 | Delaval-Crow | 308—187.2 |
| 2,145,928 | 2/1939 | Heinze et al. | 277—95 |
| 2,250,167 | 7/1941 | Niles | 308—187.1 |
| 2,286,472 | 6/1942 | Delaval-Crow | 308—187.2 X |
| 2,600,434 | 6/1952 | Saywell | 308—187.2 X |
| 2,688,521 | 9/1954 | Annen | 308-187.2 |
| 2,812,224 | 11/1957 | Richmond | 308—187.1 |
| 2,916,313 | 12/1959 | Ziller | 277—96 X |
| 2,967,743 | 1/1961 | Howe | 277—212 X |

FOREIGN PATENTS

| | | |
|---|---|---|
| 1,212,275 | 10/1959 | France. |
| 897,188 | 11/1953 | Germany. |
| 825,364 | 12/1959 | Great Britain. |
| 278,690 | 6/1949 | Switzerland. |

DAVID J. WILLIAMOWSKY, *Primary Examiner.*

ROBERT C. RIORDON, DON A. WAITE, *Examiners.*

FRANK C. HAND, FRANK SUSKO,
*Assistant Examiners.*